US011085165B2

(12) United States Patent
Huo et al.

(10) Patent No.: US 11,085,165 B2
(45) Date of Patent: Aug. 10, 2021

(54) POST-TENSION TUBE FOUNDATION AND METHOD OF ASSEMBLING SAME

(71) Applicant: RRC Power & Energy, LLC, Round Rock, TX (US)

(72) Inventors: Hongbin Huo, Round Rock, TX (US); Bill Bong, Round Rock, TX (US)

(73) Assignee: RRC POWER & ENERGY, LLC, Round Rock, TX (US)

( * ) Notice: Subject to any disclaimer, the term of this patent is extended or adjusted under 35 U.S.C. 154(b) by 0 days.

(21) Appl. No.: 16/850,864

(22) Filed: Apr. 16, 2020

(65) Prior Publication Data

US 2020/0240099 A1    Jul. 30, 2020

Related U.S. Application Data

(63) Continuation-in-part of application No. 16/250,347, filed on Jan. 17, 2019, now Pat. No. 10,662,605.
(Continued)

(51) Int. Cl.
*E02D 27/42* (2006.01)
*E02D 27/12* (2006.01)
(Continued)

(52) U.S. Cl.
CPC .............. *E02D 27/42* (2013.01); *E02D 5/58* (2013.01); *E02D 7/00* (2013.01); *E02D 27/12* (2013.01); *E02D 2200/12* (2013.01); *E02D 2250/0023* (2013.01); *E02D 2250/0046* (2013.01); *E02D 2300/002* (2013.01); *E02D 2300/0026* (2013.01); *F03D 13/22* (2016.05)

(58) Field of Classification Search
CPC ....... E04D 27/42; E04D 27/425; E04D 27/50; E04H 12/085
See application file for complete search history.

(56) References Cited

U.S. PATENT DOCUMENTS 5,586,417 A * 12/1996 Henderson .............. E02D 27/42
405/233
2002/0124502 A1 * 9/2002 Henderson ............ E04H 12/085
52/296

(Continued)

FOREIGN PATENT DOCUMENTS

CN    103334447    *    7/2013    ............. E02D 27/12
CN    103334447 A    10/2013

*Primary Examiner* — Paola Agudelo
(74) *Attorney, Agent, or Firm* — Howard & Howard Attorneys PLLC

(57) ABSTRACT

A post-tensioned tube foundation for supporting a structure subject to high upset forces is described herein. The post-tensioned tube foundation includes an outer CMP, an inner CMP, and a tubular concrete base positioned between the inner CMP and the outer CMP. The outer CMP includes an inner surface that defines a cavity extending between a first open end and an opposite second open end. The outer CMP is positioned within an excavated hole defined along a ground surface. The inner CMP is positioned within the cavity of the outer CMP such that an annular space is defined between the inner CMP and the outer CMP. The tubular concrete base is positioned within the annular space defined between the inner CMP and the outer CMP. A plurality of bracing beams extend radially outwardly from the tubular concrete base.

19 Claims, 5 Drawing Sheets

Related U.S. Application Data

(60) Provisional application No. 62/659,833, filed on Apr. 19, 2018.

(51) Int. Cl.
    *E02D 5/58*    (2006.01)
    *E02D 7/00*    (2006.01)
    *F03D 13/20*    (2016.01)

(56) References Cited

U.S. PATENT DOCUMENTS

| | | | | |
|---|---|---|---|---|
| 2004/0131428 A1* | 7/2004 | Henderson | ............ | E02D 27/42 405/233 |
| 2007/0269273 A1* | 11/2007 | Henderson | ............ | E04H 12/085 405/239 |
| 2008/0072511 A1* | 3/2008 | Phuly | ............ | E02D 27/26 52/294 |
| 2010/0146890 A1* | 6/2010 | Kristensen | ............ | F03D 13/22 52/297 |
| 2011/0278850 A1* | 11/2011 | Murata | ............ | E02D 27/425 290/55 |
| 2012/0114484 A1* | 5/2012 | Tosello | ............ | E04H 12/085 416/10 |
| 2012/0291380 A1* | 11/2012 | Tooman | ............ | E02D 31/002 52/297 |
| 2014/0255106 A1* | 9/2014 | Henderson | ............ | E02D 5/34 405/256 |
| 2014/0260023 A1* | 9/2014 | Henderson | ............ | E02D 27/50 52/295 |
| 2015/0376859 A1* | 12/2015 | Phuly | ............ | E02D 27/425 52/223.1 |
| 2016/0097179 A1* | 4/2016 | Henderson | ............ | E02D 5/80 52/158 |
| 2017/0152641 A1* | 6/2017 | Serna Garc A-Conde | ............ | E04H 12/2269 |

\* cited by examiner

US 11,085,165 B2

POST-TENSION TUBE FOUNDATION AND METHOD OF ASSEMBLING SAME

CROSS-REFERENCE TO RELATED APPLICATIONS

This application is a continuation-in-part of U.S. patent application Ser. No. 16/250,347, filed on Jan. 17, 2019, which claims the benefit of U.S. Provisional Patent Application Ser. No. 62/659,833, filed on Apr. 19, 2018, which are hereby incorporated by reference in their entirety for all purposes.

TECHNICAL FIELD

The present invention relates to concrete support foundations constructed in-situ for use in supporting a tower from a ground surface. More specifically, the present invention relates to a post-tension tube foundation for use in supporting towers subject to high overturning moment forces including, but not limited to, wind turbines, powerline towers, traffic signals, street light, freeway signs, and/or bridge supports.

BACKGROUND

At least some known foundations include piles that extend to or into the above concrete foundation and are only compression resisting foundation extensions, and do not include post-tension rods. As such, when tall, heavy and/or large structures are constructed, known pile foundations are inadequate to provide the rotational stiffness to minimized movement from dynamic forces caused by wind. The present invention is aimed at one or more of the problems identified above.

SUMMARY OF THE INVENTION

In one embodiment of the present invention, a post-tensioned tube foundation for supporting a structure subject to high upset forces is provided. The post-tensioned tube foundation includes an outer corrugated metal pipe (CMP) including an inner surface defining a cavity extending between a first open end and an opposite second open end. The outer CMP is positioned within an excavated hole defined along a ground surface. The second open end of the outer CMP positioned adjacent to a bottom of the excavated hole. The first open end of the outer CMP positioned a distance above the ground surface. A foundation plug is positioned within the cavity of the outer CMP. The foundation plug extends across the bottom of the excavated hole and including a radially outer surface positioned adjacent to the inner surface of the outer CMP. An inner CMP is positioned within the cavity of the outer CMP such that an annular space is defined between the inner CMP and the outer CMP. The inner CMP includes an outer surface extending between a top end and a bottom end. The bottom end of the inner CMP is positioned adjacent a top surface of the foundation plug. A tubular concrete base is positioned within the annular space defined between the inner CMP and the outer CMP. A void forming element is positioned within the annular space defined between the inner CMP and the outer CMP and adjacent the top surface of the foundation plug.

In another embodiment of the present invention, a method of assembling a post-tensioned tube foundation for supporting a structure subject to high upset forces is provided. The method includes excavating a hole including a tapered interior surface extending from a ground surface to a bottom surface of the hole. An outer corrugated metal pipe (CMP) is inserted into the excavated hole such that a gap is defined between the outer CMP and the tapered inner surface of the excavated hole. The outer CMP includes an inner surface defining a cavity extending between a first open end and an opposite second open end. The second open end of the outer CMP is positioned adjacent to the bottom surface of the excavated hole. The first open end of the outer CMP is positioned a distance above the ground surface. The gap defined between the excavated hole and the outer CMP is filled with cementitious material to form a tapered shape. Concrete is poured across the bottom surface of the excavated hole to form a foundation plug within the cavity of the outer CMP. The foundation plug extends across the bottom surface of the excavated hole and includes a radially outer surface positioned adjacent to the inner surface of the outer CMP. A void forming element is positioned on top of the foundation plug and adjacent to the inner surface of the outer CMP. A plurality of tensioning elements is positioned within the cavity defined by the outer CMP. An inner CMP is inserted within the cavity of the outer CMP such that an annular space is defined between the inner CMP and the outer CMP. The void forming element is positioned within the annular space defined between the inner CMP and the outer CMP. The inner CMP including an inner surface defining an interior cavity. The interior cavity is backfilled with material extending from the foundation plug to a top end of the inner CMP. Concrete is poured into the annular space defined between the inner CMP and the outer CMP to form a tubular concrete base. A reinforced concrete top slab is formed extending across the first open end of the outer CMP. The tubular concrete base extends downward from the reinforced concrete top slab to the void forming element. A clay apron is placed around the reinforced concrete top slab. The plurality of tensioning elements are tensioned to cause the tubular concrete base to compact downwardly.

In yet another embodiment of the present invention, a post-tensioned tube foundation for supporting a structure subject to high upset forces is provided. The post-tensioned tube foundation includes a foundation plug positioned within an excavated hole. The foundation plug extends across a bottom surface of the excavated hole. A void forming element positioned adjacent a top surface of the foundation plug. A tubular concrete base is positioned within the excavated hole such that the void forming element is positioned between a bottom end of the tubular concrete base and the foundation plug. A reinforced concrete top slab is positioned at a top end of the tubular concrete base and extends across an open end of the tubular concrete base. The tubular concrete base extends downward from the reinforced concrete top slab to the void forming element. A post-tensioning embedment system including a plurality of tensioning elements is positioned within the tubular concrete base and extending through the reinforced concrete top slab.

In one embodiment of the present invention, a post-tensioned tube foundation for supporting a structure subject to high upset forces is provided. The post-tensioned tube foundation includes an outer CMP, an inner CMP, and a tubular concrete base positioned between the inner CMP and the outer CMP. The outer CMP includes an inner surface that defines a cavity extending between a first open end and an opposite second open end. The outer CMP is positioned within an excavated hole defined along a ground surface. The second open end of the outer CMP is positioned adjacent to a bottom surface of the excavated hole. The first open end of the outer CMP is positioned adjacent to the ground surface. The inner CMP includes an outer surface extending between a top end and a bottom end. The inner CMP is positioned within the cavity of the outer CMP such that an annular space is defined between the inner CMP and the outer CMP. The tubular concrete base is positioned within the annular space defined between the inner CMP and the outer CMP. A plurality of bracing beams extend radially outwardly from the tubular concrete base.

In another embodiment of the present invention, a method of assembling a post-tensioned tube foundation for supporting a structure subject to high upset forces is provided. The method includes excavating a hole including a tapered interior surface extending from a ground surface to a bottom surface of the hole. An outer CMP is inserted into the excavated hole such that a gap is defined between the outer CMP and the tapered inner surface of the excavated hole. The outer CMP includes an inner surface that defines a cavity extending between a first open end and an opposite second open end. The second open end of the outer CMP is positioned adjacent to the bottom surface of the excavated hole. The first open end of the outer CMP is positioned adjacent to the ground surface. The gap defined between the excavated hole and the outer CMP is filled with cementitious material to form a tapered shape. An inner CMP is inserted within the cavity of the outer CMP such that an annular space is defined between the inner CMP and the outer CMP. The inner CMP includes an inner surface defining an interior cavity. The interior cavity is backfilled with material to a top end of the inner CMP. A plurality of tensioning elements are positioned within the annular space defined between the inner CMP and the outer CMP. Concrete is poured into the annular space defined between the inner CMP and the outer CMP to form a tubular concrete base. A plurality of reinforced concrete bracing beams are formed extending radially outwardly from the tubular concrete base. The plurality of tensioning elements are tensioned to cause the tubular concrete base to compact downwardly.

BRIEF DESCRIPTION OF DRAWINGS

Corresponding reference characters indicate corresponding parts throughout the drawings.

DETAILED DESCRIPTION OF EMBODIMENTS

With reference to the drawings, and in operation, the present invention is directed towards a post-tensions foundation for use in supporting towers that are subject to high overturning moment forces such as, for example, wind turbines, powerline towers, traffic signals, street light, freeway signs, bridge supports, and the like. In generate, the present invention overcomes the problems of at least some known foundation systems by providing a foundation system 10 that includes a post-tensioned tube shape foundation that includes a hollow tube surrounded by tapered slurry to support wind turbine towers, transmission line tower, or other high-rise structures. The annular space of the tube is formed by inner and outer corrugated metal pipes (CMPs). Anchor bolts or cables are placed in the tube embedded by concrete. The bolts and cables are post-tensioned upwardly and in turn the tube is compressed downwardly. Styrofoam underneath the tube creates void space after the tube is compressed to allow possible change of the bottom nuts to replace broken bolts or cables after operation. A concrete plug at bottom of the tube foundation ensure the integrity of the foundation and prevent water from entering into the foundation from the bottom. The clay apron at the top outside of the foundation creates positive drainage for water seepage. Tapered inversed cup shape excavation is filled with lean concrete backfill surrounding the outer CMP.

Figure 1:
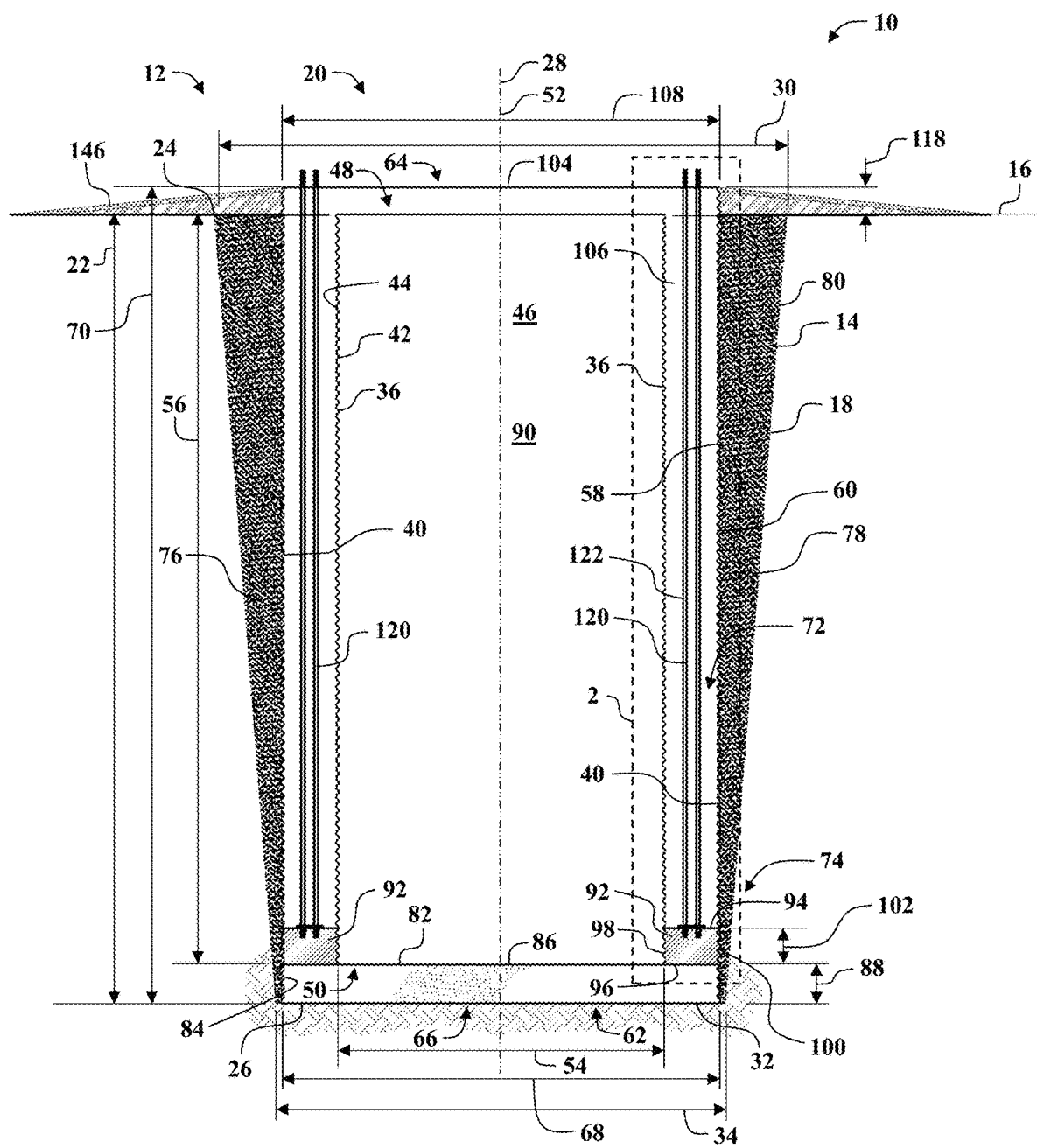
FIG. 1 is a cross-sectional view of a foundation assembly, according to an embodiment, of the present invention.
Figure 2:
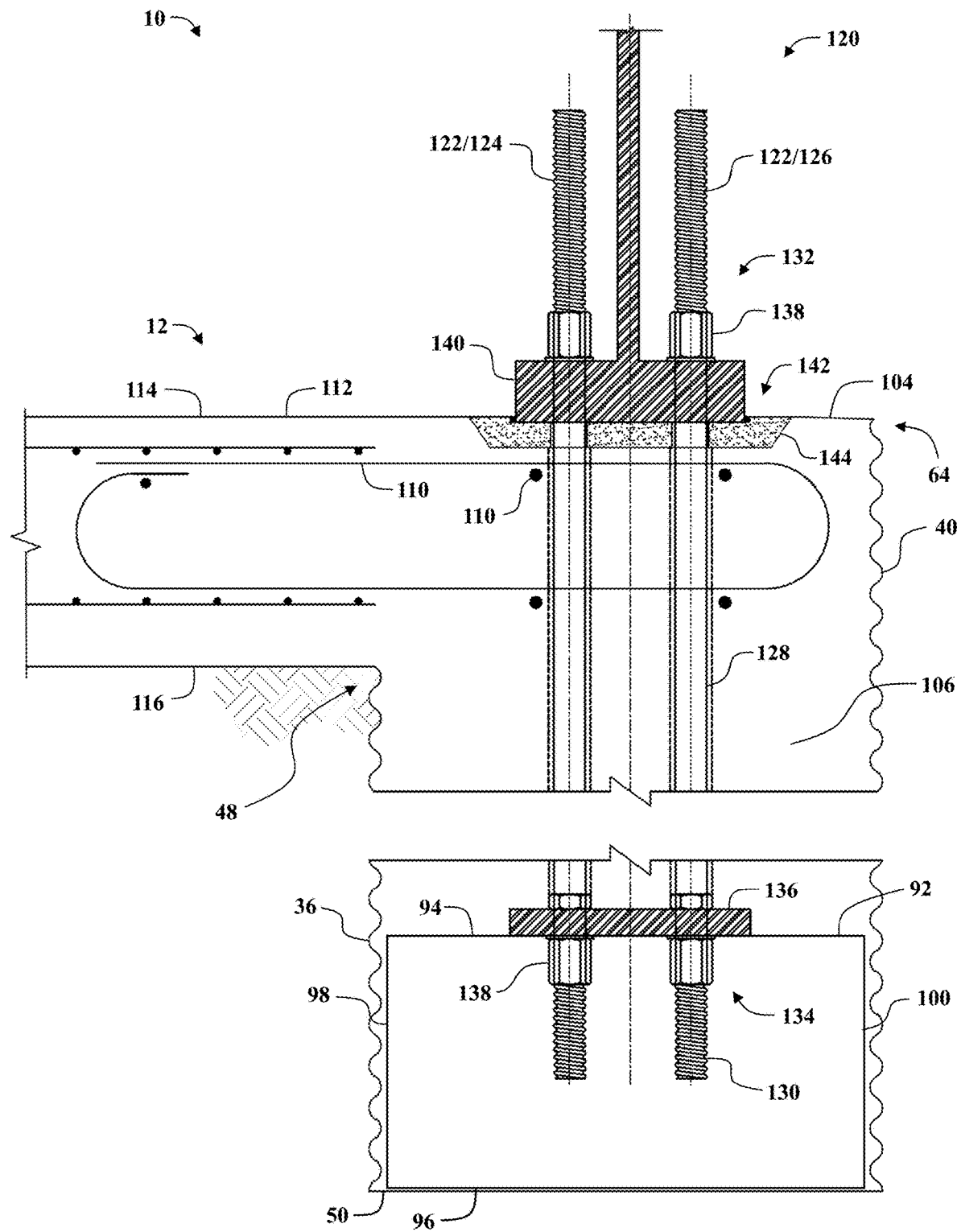
FIG. 2 is a partial view of the foundation assembly shown in FIG. 1, taken along area 2.
Figure 3:
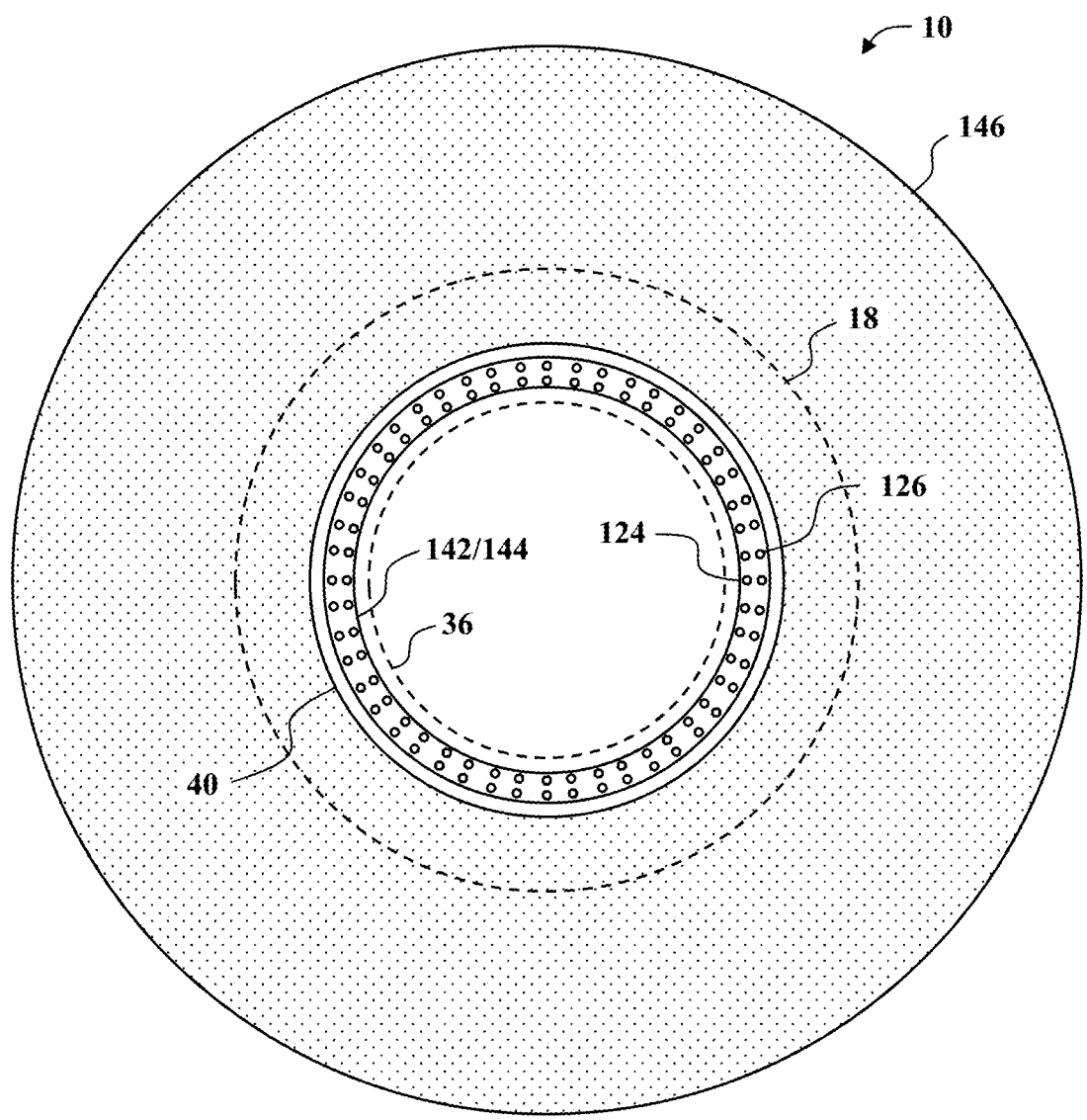
FIG. 3 is a top view of the foundation assembly shown in FIG. 1.

With reference to FIGS. 1-3, in the illustrated embodiment, the foundation system 10 includes a foundation support assembly 12 that is positioned with a excavated hole 14 defined along a ground surface 16. The excavated hole 14 includes a tapered interior surface 18 that defines a cavity 20 having a depth 22 defined between an open top end 24 and a closed bottom end 26 along a vertical axis 28. The top end 24 is defined at the ground surface 16 and has a first width 30 measure between opposite sides of the tapered interior surface 18. The bottom end 26 is defined at a bottom surface 32 of the excavated hole 14 and has a second width 34 measure between the opposite sides of the tapered interior surface 18 that is smaller than the first width 30 of the top end 24.

The foundation support assembly 12 includes an inner corrugated metal pipe (CMP) 36 and an outer CMP 40 that is orientated concentrically with the inner CMP 36, and spaced radially outwardly from the inner CMP 36. The inner CMP 36 includes a body that includes an inner surface 42 and an outer surface 44. The inner surface 42 of the inner CMP 36 forms a substantially cylindrical cavity 46 extending between a first open end 48 and a second open end 50 along a centerline axis 52, and having a first diameter 54. The outer surface 44 of the inner CMP 36 includes a first length 56 measured along the centerline axis 52 between the first open end 48 and the second open end 50.

The outer CMP 40 includes a body that includes an inner surface 58 and an outer surface 60. The inner surface 58 of the outer CMP 40 forms a substantially cylindrical cavity 62 extending between a first open end 64 and a second open end 66 along the centerline axis 52, and having a second diameter 68. The outer surface 60 of the outer CMP 40 includes second length 70 measured along the centerline axis 52 between the first open end 64 and the second open end 66.

In the illustrated embodiment, the diameter 68 of the outer CMP 40 is larger than the diameter 54 of the inner CMP 36. The inner CMP 36 is positioned within the cavity 62 of the outer CMP 40 such that the outer CMP 40 is positioned radially outwardly from the inner CMP 36 and an annular space 72 is defined between the outer surface 44 of the inner CMP 36 and the inner surface 58 of the outer CMP 40.

The outer CMP 40 is positioned within the excavated hole 14 such that a gap 74 is formed between the outer surface 60 of the outer CMP 40 and the interior surface 18 of the excavated hole 14. The second end 66 of the outer CMP 40 contacts the bottom surface 32 of the excavated hole 14. In addition, the length 70 of the outer CMP 40 is longer than the depth 22 of the excavated hole 14 such that a portion of the outer CMP 40 extends upwardly a distance from the ground surface 16 with the outer CMP 40 positioned within the excavated hole 14. In one embodiment, the diameter 68 of the outer CMP 40 is less than the width 34 of the bottom end 26 of the excavated hole 14.

In the illustrated embodiment, a volume 76 of lean concrete backfill material 78 is placed within the space 74 defined between the outer surface 60 of the outer CMP 40 and the interior surface 48 of the excavated hole 14. The volume 76 of lean concrete backfill material 78 extends from the second end 66 of the outer CMP 40 to the top end 24 of the excavated hole 14. The volume 76 of lean concrete backfill material 78 surrounds a perimeter of the outer CMP 40 to form a support structure 80 having a frustoconical shape.

A foundation plug 82 is positioned within the cavity 62 of the outer CMP 40 and adjacent the bottom surface 32 of the excavated hole 14. The foundation plug 82 includes a radially outer surface 84 that contacts the inner surface 58 of the outer CMP 40, an upper surface 86 that extends across the second open end 66 of the outer CMP 40, and a depth 88 measured along the vertical axis 28 from the bottom surface 32 of the excavated hole 14 to the upper surface 86. The second end 50 of the inner CMP 36 contacts the upper surface 86 of the foundation plug 82 to support the inner CMP 36 from the foundation plug 82. In the illustrated embodiment, the foundation plug 82 is formed from concrete.

A volume 90 of backfill soil material is positioned with the cavity 46 of the inner CMP 36 and extends from the first end 48 of the inner CMP 36 to the second end 50 of the inner CMP 36.

A void forming element 92 is orientated between the outer surface of the inner CMP 36 and the inner surface 58 of the outer CMP 40, and is positioned adjacent to the second end 50 of the inner CMP 36. In one embodiment, the void forming element 92 includes a top surface 94, a bottom surface 96, a radially inner surface 98, and a radially outer surface 100, and a depth 102 measured along the vertical axis 28 between the top surface 94 and the bottom surface 96. The bottom surface 96 is adjacent to the upper surface 86 of the foundation plug 82. The radially inner surface 98 is adjacent to the outer surface 44 of the inner CMP 36, and the radially outer surface 100 is adjacent to the inner surface 58 of the outer CMP 40. In the illustrated embodiment, the void forming element 92 is formed from a Styrofoam material that is easily removable to access the volume occupied by the void forming element 92. In another embodiment, the void forming element 92 may be formed of molded plastic and/or any suitable material that may be removed.

In the illustrated embodiment, the foundation support assembly 12 includes a reinforced concrete top slab 104 and a tubular concrete base 106 extending downwardly from reinforced concrete top slab 104. The reinforced concrete top slab 104 extends across the first open end 64 of the outer CMP 40 and includes a diameter 108 equal to the diameter 68 of the outer CMP 40. The top slab 104 includes a plurality of reinforcement steel members 110 embedded in a concrete slab 112 that extends between an upper surface 114 positioned adjacent the first end 64 of the outer CMP 40 and a lower surface 116 adjacent the first end 48 of the inner CMP 36, and a depth 118 measured between the first end 48 of the inner CMP 36 and the first end 64 of the outer CMP 40 along the vertical axis 28. The tubular concrete base 106 is formed within the annular space 72 defined between the inner CMP 36 and the outer CMP 40, and extends from the lower surface 116 of the top slab 104 to the top surface 94 of the void forming element 92.

In the illustrated embodiment, the foundation system 10 includes a post-tensioning embedment system 120 embedded within the foundation support assembly 12 and orientated about a perimeter of the foundation support assembly 12. The post-tensioning embedment system 120 includes a plurality of tensioning elements 122 that are positioned within the tubular concrete base 106 and extend through the top slab 104. The plurality of tensioning elements 122 are spaced circumferentially about the centerline axis 52 and include a plurality of inner tensioning elements 124 and a plurality of outer tensioning elements 126. The outer tensioning elements 126 are positioned between the inner tensioning elements 124 and the outer CMP 40. Each tensioning element 122 includes a plastic sleeve 128 and a bolt and/or cable 130 that extends through the plastic sleeve 128 between an upper end 132 and a lower end 134 along the vertical axis 28. An embedment ring plate 136 is positioned within the tubular concrete base 106 and orientated adjacent to the top surface 94 of the void forming element 92. The lower end 136 of each tensioning element 122 extends through the embedment ring plate 136 and is coupled to the embedment ring plate 136 with one or more fastening nuts 138. The bolts are fixed by nuts onto the embedment ring plate 136 so that they can be tensioned. An anchor plate 140 is positioned adjacent to the upper surface 114 of the reinforced concrete top slab 104. The upper end 132 of each tensioning element 122 extends through the anchor plate 140 and is coupled to the anchor plate 140 with one or more fastening nuts 138. In the illustrated embodiment, a groove 142 is defined along the upper surface 114 of the reinforced concrete top slab 104. The anchor plate 140 is positioned within the groove 142 and a volume 144 of concrete grout is placed within the groove 142 and between the anchor plate 140 and the top slab 104. A clay apron 146 extends around a perimeter of the outer CMP 40 and is sized and shaped to facilitate draining water away from the reinforced concrete top slab 104.

In the illustrated embodiment, the post-tensioned concrete tube foundation 10 is configured to support on its upper surface 114 a tower or other structure subject to high upset forces. The post-tensioned tube foundation 10 includes a cementitious foundation tube 106 for supporting a tower or other structure from an upper surface 114 and having a lower surface. The foundation 10 also includes a plurality of tensioning elements 122, such as bolts or cables, each having a cover plastic sleeve 128 and terminating at the lower end of the tube foundation 106. A tapered inversed cup shape excavation 14 is filled with lean concrete backfill surrounding the outer CMP 40. A void forming element 92 is positioned at the bottom of the tube foundation 106 for creating a void space or future removable region at the bottom of the tube foundation 106 to facilitate replacing possible broken bolts or cables. The foundation 10 also includes inner and outer corrugated metal pipes 36 and 40 for forming the tube annular space for the tube foundation 106 wherein the tensioning elements and concrete are placed. A concrete plug 82 is positioned at the bottom of the tube foundation 106 to ensure the integrity of the foundation 106 and to facilitate preventing water from entering into the foundation from the bottom. A clay apron 146 is positioned at the top outside of the tube foundation to create positive drainage for water seepage.

In one embodiment, the void forming element 92 includes a molded plastic form or a Styrofoam. The elongated sleeve 128 is formed from PVC tubing. The tensioning elements 122 may be solid tendons, bolts or cables. An anchor plate 140 may be positioned surrounding the upper end of each tensioning element 122 and a tension nut threaded onto the upper end of each tensioning element 122 to retain elongation of the tensioning elements 122 upon tensioning.

In one embodiment, the foundation 10 includes a plurality of tower post-tensioning elements 122 that each extend between an embedment ring plate 136 in a lower portion of the foundation 10 upwardly through the tube foundation 106 to an upper end projecting above the tube foundation upper surface for engaging a base plate 140 of a tower or other structure to be supported on the tube foundation 106. Each tower post-tensioning elements 122 may be encased in an elongated sleeve 128 extending from the embedment ring plate 136 to adjacent a respective upper end to permit free elongation of the tower post-tensioning element through the tube foundation 106 upon post-tensioning. The tube foundation top slab 104 includes reinforcing steel rebar to resist bending forces. In one embodiment, the void forming element 92 is selected from the group consisting of an open bottom disk, a disk made of expanded polyurethane or Styrofoam, an inflatable or pressurized bladder, and any other material that is compressible.

In the illustrated embodiment, the void forming element facilitates forming a void space that can be accessed from inside of the inner CMP 36. For example, the inner CMP 36 is filled with soil. So if needed, the soil inside the inner CMP can be excavated out, an operator may then enter into the inner CMP to access the void space to perform repairs and/or replacements of the tensioning elements.

In the illustrated embodiment, the post-tensioned tube foundation 10 includes the outer CMP positioned within the excavated hole 14 defined along a ground surface. The second open end 66 of the outer CMP 40 is positioned adjacent to a bottom surface 32 of the excavated hole 14. The first open end 64 of the outer CMP 40 is positioned a distance above the ground surface 16. The foundation plug 82 is positioned within the cavity 62 of the outer CMP 40. The foundation plug 82 extends across the bottom surface 32 of the excavated hole 14 and includes a radially outer surface positioned adjacent to the inner surface of the outer CMP 40. The inner CMP 36 is positioned within the cavity 62 of the outer CMP 40 such that an annular space 72 is defined between the inner CMP 36 and the outer CMP 40. The bottom end of the inner CMP 36 is positioned adjacent a top surface of the foundation plug 82. The tubular concrete base 106 is positioned within the annular space 72 defined between the inner CMP 36 and the outer CMP 40. The void forming element 92 is positioned within the annular space 72 defined between the inner CMP 36 and the outer CMP 40 and adjacent the top surface of the foundation plug 82.

In one embodiment, the excavated hole 14 includes a tapered interior surface and a volume of lean concrete backfill formed within a spaced defined between the outer surface of the outer CMP and the tapered interior surface. In another embodiment, the void forming element may be formed from a compressible material including at least one of an expanded polyurethane, Styrofoam, a pressurized bladder, and a molded plastic.

In addition, the post-tensioned tube foundation 10 may include the reinforced concrete top slab 104 extending across the first open end of the outer CMP 40 with the tubular concrete base 106 extending downward from the reinforced concrete top slab 104 to the void forming element 92. The plurality of tensioning elements 122 may be positioned within the tubular concrete base 106 and extend through the top slab 104 and the lower end of each tensioning element 122 is embedded within the void forming element 92. An embedment ring plate 136 may be positioned within the tubular concrete base 106 and orientated adjacent to a top surface of the void forming element 92. The lower end of each tensioning element 122 may extend through the embedment ring plate 136 and is coupled to the embedment ring plate 136 with one or more fasteners. An anchor plate 140 may be positioned adjacent to an upper surface of the reinforced concrete top slab 104 and each tensioning element 122 may extend through the anchor plate 140 to be coupled to the anchor plate 140 with one or more fasteners. Each of the tensioning elements 122 may be configured to engage a base plate 140 of a tower to be supported on the post-tensioned tube foundation 10. One post tensioning elements 122 may also include a sleeve 128 orientated between the anchor plate and the embedment ring plate. The tensioning element 122 may extend through the plastic sleeve between the upper end and the lower end. In one embodiment, the sleeve 128 is PVC tubing, and the tensioning element 122 may include a solid tendon, a bolt, or a cable.

In one embodiment, the present invention includes a method of assembling a post-tensioned tube foundation for supporting a structure subject to high upset forces. The method includes excavating a hole 14 including a tapered interior surface extending from a ground surface to a bottom surface of the hole. The outer CMP 40 is inserted into the excavated hole such that a gap is defined between the outer CMP 40 and the tapered inner surface of the excavated hole 14. The outer CMP 40 includes an inner surface defining a cavity extending between a first open end and an opposite second open end. The second open end of the outer CMP 40 is positioned adjacent to the bottom surface of the excavated hole. The first open end of the outer CMP 40 is positioned a distance above the ground surface. The gap defined between the excavated hole and the outer CMP is filled with cementitious material to form a tapered shape. Concrete is poured across the bottom surface of the excavated hole 14 to form the foundation plug 82 within the cavity of the outer CMP 40. The foundation plug 82 extends across the bottom surface of the excavated hole 14 and includes a radially outer surface positioned adjacent to the inner surface of the outer CMP 40. The void forming element 92 is positioned on top of the foundation plug and adjacent to the inner surface of the outer CMP 40. The plurality of tensioning elements 122 are positioned within the cavity defined by the outer CMP 40. The inner CMP 36 is then inserted within the cavity of the outer CMP 40 such that an annular space 72 is defined between the inner CMP 36 and the outer CMP 40. The void forming element 92 is positioned within the annular space 72 defined between the inner CMP 36 and the outer CMP 40. The inner CMP 36 includes an inner surface defining an interior cavity that is backfilled with material extending from the foundation plug to a top end of the inner CMP 36. Concrete is poured into the annular space 72 defined between the inner CMP 36 and the outer CMP 40 to form a tubular concrete base 106. The reinforced concrete top slab 104 is formed extending across the first open end of the outer CMP 40. The tubular concrete base 106 extends downward from the reinforced concrete top slab 104 to the void forming element 92. The clay apron 146 is placed around the reinforced concrete top slab. After the concrete has cured, the plurality of tensioning elements 122 are tensioned to cause the tubular concrete base 106 to compact downwardly.

In one embodiment, the present invention includes a method for forming a post-tensioned tube foundation for supporting on its upper surface a tower or other structure subject to high upset forces. The method includes the steps of: (a) excavating a hole in a ground surface with tapered shape; (b) placing outer corrugated metal pipe in the excavated hole; (c) allowing the cementitious material in between the outer corrugated metal pipe and the hole to cure and solidify to form the tapered shape; (d) placing concrete at the bottom of the outer corrugated metal pipe to cure and solidify to form the bottom plug; (e) placing the void form on top of the bottom plug; (f) assembling the tensioning elements and embedment system at ground surface; (g) installing the tensioning elements and embedment system on top of the void form in the outer corrugated metal pipe; (h) installing the inner corrugated metal pipe; (i) backfilling soil in the inner corrugated metal pipe to the top of the inner corrugated metal pipe; (j) placing concrete in the annular space between the inner and corrugated metal pipes; (k) placing concrete in the top of the backfill soil to form the top slab of the tube foundation; (l) placing the clay apron around the tube foundation to form positive drainage; and (m) tensioning the post-tensioning elements from above the tube foundation to elongate the post-tensioning elements above the lower end and cause the tube foundation to compact downwardly.

Figure 4:
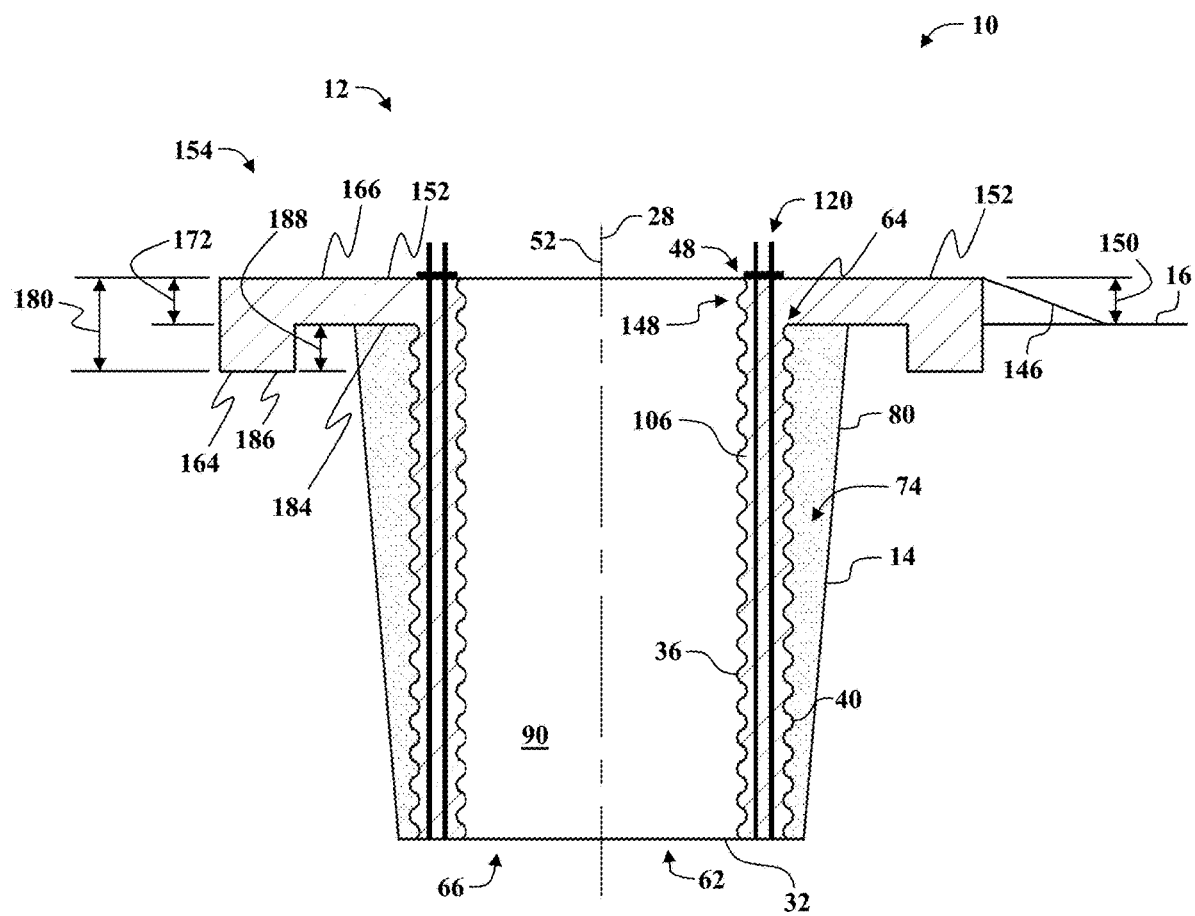
FIG. 4 is a cross-sectional view of the foundation assembly, according to an embodiment, of the present invention.
Figure 5:
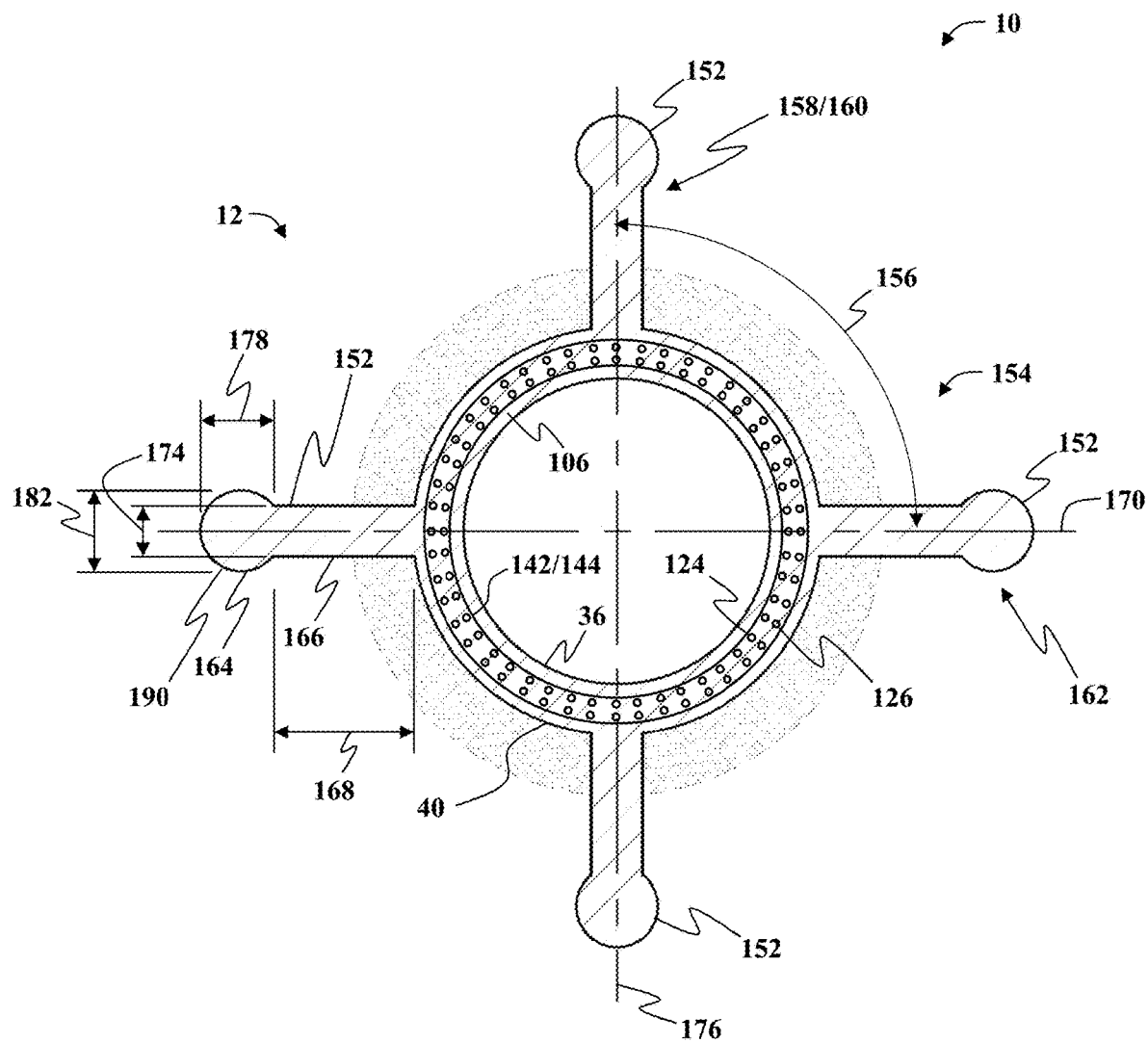
FIG. 5 is a top view of the foundation assembly shown in FIG. 4.

Referring to FIGS. 4 and 5, in some embodiments, the foundation support assembly 12 includes the outer CMP 40 positioned within the excavated hole such that the second open end 66 of the outer CMP 40 is adjacent to the bottom surface 32 of the excavated hole 14 and the first open end 64 of the outer CMP 40 is positioned adjacent to the ground surface 16. In addition, the inner CMP 36 is positioned within the cavity 62 of the outer CMP 40 such that the top end 48 of the inner CMP 36 is positioned a vertical distance above the first open end 64 of the outer CMP 40. For example, as shown in FIG. 4, in one embodiment, the top end 64 of the outer CMP 40 may be positioned adjacent to the ground surface 16 and the top end 48 of the inner CMP 36 may be positioned above ground surface 16 such that a top portion 148 of the tubular concrete base 106 extends a vertical distance 150 above the ground surface 16. The space 74 defined between the outer surface 60 of the outer CMP 40 and the interior surface 48 of the excavated hole 14 is filled with volume of low strength slurry and/or lean concrete backfill material to form the support structure 80 having a frustoconical shape. The post-tensioning embedment system 120 is embedded within the foundation support assembly 12, and the clay apron 146 extends around a perimeter of the tubular concrete base 106 to facilitate draining water away from the tubular concrete base 106.

The foundation support assembly 12 also includes a plurality of bracing beams 152 that extend radially outwardly from the tubular concrete base 106 to form a braced tube foundation 154. In the illustrated embodiment, each bracing beam 152 is formed of high strength reinforced concrete and is spaced an angular distance 156 from an adjacent bracing beam 152. In some embodiments, each bracing beam 152 is spaced the same angular distance 156 from each adjacent bracing beam 152. For example, as shown in FIG. 5, in some embodiments, each bracing beam 152 may be orientated perpendicular to the adjacent bracing beams 152. In other embodiments, the bracing beams 152 may be spaced at different angular distances from adjacent bracing beams 152.

In the illustrated embodiment, each bracing beam 152 extends radially outwardly from the top portion 148 of the tubular concrete base 106. In other embodiments, one or more bracing beams may extend outwardly from the tubular concrete base 106 at various locations along the vertical axis 28.

In some embodiments, the plurality of bracing beams 152 includes at least one pair 158 of opposing bracing beams 152 that extend radially outwardly from the tubular concrete base 106 in opposite directions. For example, as shown in FIG. 5, the foundation support assembly 12 may include a first pair 160 of opposing bracing beams 152 and a second pair 162 of opposing bracing beams 152. In one embodiment, the second pair 162 of opposing bracing beams 152 is orientated perpendicular to the first pair 160 of opposing bracing beams 152. In other embodiments, the second pair 162 of opposing bracing beams 152 may be orientated at an angular distance 156 that is less than, or greater than, 90° from the first pair 160 of opposing bracing beams 152. In addition, the foundation support assembly 12 may include a plurality of pairs 158 of opposing bracing beams 152 spaced about the tubular concrete base 106 at the same, or different, angular distances.

One or more bracing beams 152 includes an anchoring member 164 and a support arm 166 that is coupled between the anchoring member 164 and the tubular concrete base 106 such that the anchoring member 164 is spaced a distance from the tubular concrete base 106. The support arm 166 includes a length 168 defined along a longitudinal axis 170, a thickness 172 defined along the vertical axis 28, and a width 174 defined along a horizontal axis 176. The anchoring member 164 also includes a length 178 defined along the longitudinal axis 170, a thickness 180 defined along the vertical axis 28, and a width 182 defined along the horizontal axis 176.

In the illustrated embodiment, the thickness 180 of the anchoring member 164 is greater than the thickness 172 of the support arm 166. In addition, the support arm 166 includes a bottom surface 184 that is adjacent to the ground surface 16 with at least a portion of the anchoring member 164 positioned below the ground surface 16. For example, as shown in FIG. 4, the anchoring member 164 may include a bottom surface 186 that is spaced a vertical distance 188 below the bottom surface 184 of the support arm 166. In addition, in some embodiments, the anchoring member 164 may include an arcuate radially outer surface 190.

In one embodiment, each bracing beam 152 includes a support arm 166 and an anchoring member 164. In some embodiments, each support arm 166 has the same length 168. In other embodiments, one or more support arms 166 may have different lengths 168. In addition, in some embodiments, each support arm 166 may have the same cross-sectional shape having the same width 174 and thickness 172 dimensions. In other embodiments, one or more support arms 166 may have a different cross-sectional shape and/or different width 174 and/or thickness 172 dimensions. Similarly, in some embodiments, each anchoring member 164 may have the same cross-sectional shape having the same width 182, length 178, and thickness 180 dimensions. In other embodiments, one or more anchoring members 164 may have a different cross-sectional shape and/or different width 182, length 178, and/or thickness 180 dimensions.

In one embodiment, the present invention includes a method for forming a post-tensioned tube foundation for supporting on its upper surface a tower or other structure subject to high upset forces. The method includes the steps of: (a) excavating a hole including a tapered interior surface extending from a ground surface to a bottom surface of the hole; (b) inserting an outer corrugated metal pipe (CMP) into the excavated hole such that a gap is defined between the outer CMP and the tapered inner surface of the excavated hole, the outer CMP including an inner surface defining a cavity extending between a first open end and an opposite second open end, the second open end of the outer CMP positioned adjacent to the bottom surface of the excavated hole, the first open end of the outer CMP positioned adjacent to the ground surface; (c) filling the gap defined between the excavated hole and the outer CMP with cementitious material to form a tapered shape; (d) inserting an inner CMP within the cavity of the outer CMP such that an annular space is defined between the inner CMP and the outer CMP, the inner CMP including an inner surface defining an interior cavity; (e) backfilling the interior cavity with material to a top end of the inner CMP; (f) positioning a plurality of tensioning elements within the annular space defined between the inner CMP and the outer CMP; (g) pouring concrete into the annular space defined between the inner CMP and the outer CMP to form a tubular concrete base; (h) forming a plurality of reinforced concrete bracing beams extending radially outwardly from an outer surface of the tubular concrete base; and (i) tensioning the plurality of tensioning elements to cause the tubular concrete base to compact downwardly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A post-tensioned tube foundation for supporting a structure subject to high upset forces, comprising:
    an outer corrugated metal pipe (CMP) including an inner surface defining a cavity extending between a first open end and an opposite second open end, the outer CMP positioned within an excavated hole defined along a ground surface, the second open end of the outer CMP positioned adjacent to a bottom surface of the excavated hole, the first open end of the outer CMP positioned adjacent to the ground surface;
    an inner CMP including an outer surface extending between a top end and a bottom end, the inner CMP positioned within the cavity of the outer CMP such that an annular space is defined between the inner CMP and the outer CMP;
    a tubular concrete base positioned within the annular space defined between the inner CMP and the outer CMP; and
    a plurality of bracing beams extending radially outwardly from a top end of the tubular concrete base, wherein the plurality of bracing beams are formed from concrete and unitarily formed with the tubular concrete base, wherein the wherein at least one of each of the plurality of bracing beams includes a support arm and an anchoring member, wherein the support arm and the anchoring member of the plurality of bracing beams are formed from concrete and unitarily formed with the tubular concrete base, the support arm being connected to the tubular concrete base and the anchoring member extending downward from an outer end of the supporting arm, wherein at least a portion of the anchoring member is positioned below the ground surface.

2. The post-tensioned tube foundation of claim 1, wherein the top end of the inner CMP is positioned a vertical distance above the first open end of the outer CMP.

3. The post-tensioned tube foundation of claim 1, wherein each bracing beam of the plurality of bracing beams is spaced an angular distance from an adjacent bracing beam.

4. The post-tensioned tube foundation of claim 3, wherein each bracing beam is spaced the same angular distance from each adjacent bracing beam.

5. The post-tension tube foundation of claim 1, wherein the plurality of bracing beams includes at least one pair of opposing bracing beams extending radially outwardly from the tubular concrete base in opposite directions.

6. The post-tensioned tube foundation of the claim 5, wherein the plurality of bracing beams includes a first pair of opposing bracing beams and a second pair of opposing bracing beams.

7. The post-tensioned tube foundation of claim 6, wherein the second pair of opposing bracing beams is orientated perpendicular to the first pair of opposing bracing beams.

8. The post-tensioned tube foundation of claim 1, wherein each bracing beam extends radially outwardly from a top portion of the tubular concrete base.

9. A post-tensioned tube foundation for supporting a structure subject to high upset forces, comprising:
    an outer corrugated metal pipe (CMP) including an inner surface defining a cavity extending between a first open end and an opposite second open end, the outer CMP positioned within an excavated hole defined along a ground surface, the second open end of the outer CMP positioned adjacent to a bottom surface of the excavated hole, the first open end of the outer CMP positioned adjacent to the ground surface;
    an inner CMP including an outer surface extending between a top end and a bottom end, the inner CMP positioned within the cavity of the outer CMP such that an annular space is defined between the inner CMP and the outer CMP;
    a tubular concrete base positioned within the annular space defined between the inner CMP and the outer CMP; and
    a plurality of bracing beams extending radially outwardly from a top end of the tubular concrete base, wherein at least one of each of the plurality of bracing beams includes a support arm and an anchoring member, wherein the anchoring member includes a minimum thickness that is greater than a maximum thickness of the support arm.

10. The post-tensioned tube foundation of claim 1, wherein the anchoring member includes an arcuate radially outer surface.

11. The post-tensioned tube foundation of claim 9, wherein at least a portion of the anchoring member is positioned below the ground surface.

12. The post-tensioned tube foundation of claim 11, wherein a bottom surface of the support arm is adjacent the ground surface.

13. The post-tensioned tube foundation of claim 1, wherein each bracing beam is formed of high strength reinforced concrete.

14. A method of assembling a post-tensioned tube foundation for supporting a structure subject to high upset forces, comprising the steps of:

excavating a hole including a tapered interior surface extending from a ground surface to a bottom surface of the hole;

inserting an outer corrugated metal pipe (CMP) into the excavated hole such that a gap is defined between the outer CMP and the tapered inner surface of the excavated hole, the outer CMP including an inner surface defining a cavity extending between a first open end and an opposite second open end, the second open end of the outer CMP positioned adjacent to the bottom surface of the excavated hole, the first open end of the outer CMP positioned adjacent to the ground surface;

filling the gap defined between the excavated hole and the outer CMP with cementitious material to form a tapered shape;

inserting an inner CMP within the cavity of the outer CMP such that an annular space is defined between the inner CMP and the outer CMP, the inner CMP including an inner surface defining an interior cavity;

backfilling the interior cavity with material to a top end of the inner CMP;

positioning a plurality of tensioning elements within the annular space defined between the inner CMP and the outer CMP;

pouring concrete into the annular space defined between the inner CMP and the outer CMP to form a tubular concrete base;

forming a plurality of reinforced concrete bracing beams extending radially outwardly from the tubular concrete base, wherein the plurality of bracing beams are formed from concrete and unitarily formed with the tubular concrete base, wherein at least one of each of the plurality of bracing beams includes a support arm and an anchoring member, the support arm being connected to the tubular concrete base and the anchoring member extending downward from an outer end of the supporting arm, wherein at least a portion of the anchoring member is positioned below the ground surface; and tensioning the plurality of tensioning elements to cause the tubular concrete base to compact downwardly.

15. The method of claim 14, wherein the plurality of bracing beams includes a first pair of opposing bracing beams and a second pair of opposing bracing beams orientated perpendicular to the first pair of opposing bracing beams.

16. The method of claim 14, wherein each bracing beam extends radially outwardly from a top portion of the tubular concrete base.

17. The method of claim 14, wherein the anchoring member includes a thickness that is greater than a thickness of the support arm.

18. The method of claim 14, wherein a bottom surface of the support arm is adjacent the ground surface and at least a portion of the anchoring member is positioned below the ground surface.

19. The method of claim 14, wherein a top end of the inner CMP is positioned a vertical distance above the first open end of the outer CMP.

* * * * *